US006991867B1

(12) United States Patent
Zhu

(10) Patent No.: US 6,991,867 B1
(45) Date of Patent: Jan. 31, 2006

(54) FUEL CELL

(76) Inventor: Bin Zhu, KTH, Kemisk Teknologi, Teknikringen 42, SE-100 44 Stockholm (SE)

( * ) Notice: Subject to any disclaimer, the term of this patent is extended or adjusted under 35 U.S.C. 154(b) by 0 days.

(21) Appl. No.: 09/719,234

(22) PCT Filed: Jun. 11, 1999

(86) PCT No.: PCT/SE99/01046

§ 371 (c)(1),
(2), (4) Date: Dec. 11, 2000

(87) PCT Pub. No.: WO99/65098

PCT Pub. Date: Dec. 16, 1999

(30) Foreign Application Priority Data

Jun. 12, 1998 (SE) ................................ 9802103

(51) Int. Cl.
*H01M 4/86* (2006.01)
*H01M 4/58* (2006.01)
*H01M 8/10* (2006.01)
*H01M 8/02* (2006.01)

(52) U.S. Cl. .................. 429/33; 429/40; 429/218.1; 429/305

(58) Field of Classification Search ............. 429/46, 429/16, 30, 44, 218.1, 305
See application file for complete search history.

(56) References Cited

U.S. PATENT DOCUMENTS

| 3,351,491 | A | | 11/1967 | Harris et al. |
| 3,489,610 | A | * | 1/1970 | Berger et al. ............... 76/80.5 |
| 3,497,389 | A | * | 2/1970 | Berger et al. ............... 204/295 |
| 3,775,185 | A | * | 11/1973 | Kunz et al. ................... 429/46 |
| 4,317,865 | A | * | 3/1982 | Trocciola et al. ............ 429/41 |
| 4,352,869 | A | * | 10/1982 | Mellors ..................... 429/321 |
| 4,423,122 | A | * | 12/1983 | Iacovangelo et al. ........ 429/45 |
| 4,564,567 | A | * | 1/1986 | Kucera et al. ................ 429/41 |
| 5,139,896 | A | * | 8/1992 | Smith et al. .................. 429/40 |
| 5,632,874 | A | | 5/1997 | Christiansen |

OTHER PUBLICATIONS

Sokolov, Ann. secteur anal. phys-chim. Inst. chim gen. (U.S.S.R.)(1938), 11, 237-51. (Abstract only).*
JP 60074270 A, World Patent Index, Derwent Publications, Ltd. Apr. 26, 1985.

* cited by examiner

*Primary Examiner*—Patrick Joseph Ryan
*Assistant Examiner*—Melissa Austin
(74) *Attorney, Agent, or Firm*—Young & Thompson

(57) ABSTRACT

A fuel cell for production of electrical energy, such as a fuel cell, comprising a fuel chamber (1), an anode (2*a*), a cathode (2*b*), an electrolyte (3) disposed between said anode and said cathode, an oxidant chamber (4), wherein said chambers (1 and 4) enclose said anode, cathode and electrolyte, wherein a fuel flowing from the fuel chamber is oxidized at the anode, thereby producing electrical energy, wherein said electrolyte (3) is a ceramic composite electrolyte comprising at least one salt and at least one oxide in mixture.

4 Claims, 3 Drawing Sheets

FUEL CELL

FIELD OF THE INVENTION

This invention relates to a fuel cell and more particularly the invention relates to an intermediate temperature fuel cell.

The present invention is also relevant to catalysts and membrane reactors, such as hydrogen generator and penetration devices.

Furthermore, the invention is also relevant to devices for treatment of hazardous gases, such as desulphurisation, and waste chlorine treatment etc.

BACKGROUND OF THE INVENTION

A fuel cell is an electrochemical cell which can continuously convert chemical energy of a fuel and an oxidant to electrical energy by a process involving an essentially invariant electrode-electrolyte system. Fuel cells work at high efficiency with emission levels far below the most strict standards. Fuel cell systems have the advantage of being modular, therefore they can be built in a wide range of power requirements, from a few hundred watts up to megawatts.

The basic principles of a fuel cell are those of well known electrochemical batteries. The difference is that in the case of batteries, the chemical energy is stored in substances located inside them. When this energy is converted to electrical energy, the battery must be thrown away (primary batteries) or recharged (secondary batteries). In a fuel cell, the chemical energy is provided by a fuel and an oxidant stored outside the cell in which the chemical reactions take place.

The fuel cell comprises an anode, an electrolyte and a cathode. The fuel is oxidised at the anode, and the oxidant is reduced at the cathode. The reactions can be described as "cold combustion", giving water as combustion product. In between the anode/cathode is the electrolyte.

During the cold combustion in the fuel cell electrical work is produced corresponding to a change in free energy determined by the equation of Gibbs-Helmholtz (1) as follows:

$$\Delta G = \Delta H - T^* \Delta S = U^* n^* F \tag{1}$$

$\Delta H$ being the change in enthalpy in J/mole when water is formed from its elements (corresponding to the amount of heat liberated at open combustion of hydrogen gas at constant pressure and temperature), T is the absolute temperature in K and $\Delta S$ the change in entropy in J/K*mole; U is the open voltage of the fuel cell, n is the number of electrons consumed at the reaction (n=4 for each water molecule formed for a hydrogen/oxygen cell) and F is Faraday's constant (96 485 As/mole).

The current density for fuel cell electrodes is limited by the reactants and normally reaches less than A/cm$^2$.

For practical reasons, fuel cell systems are simply distinguished by the type of electrolyte used and the following names and abbreviations are now frequently used in literature: alkaline fuel cells (AFC), phosphoric acid fuel cells (PAFC), solid/molten state cells (SSFC) such as: molten carbonate fuel cells (MCFC), solid oxide fuel cells (SOFC) and proton exchange membrane fuel cells (PEMFC). The fuel cells mentioned above will be described in more detail below.

The alkaline fuel cell (AFC) is used for instance in the space and military industry, for instance in submarines.

Solid/molten state cells (SSFC) of today are of three basic types, PEMFC (Polymer electrolyte), MCFC (Molten Carbon) and SOFC (Solid Oxide).

Efforts have been made to construct solid state fuel cells using carbonate melts (MCFCs), but they usually have low efficiency.

PEMFCs use proton-exchange polymer membranes as electrolytes. The presence of water in the membranes limits the operational temperatures to below 100° C. This causes slow electrode kinetics and low tolerance of electrodes to fuel impurities such as carbon monoxide (CO). As a result, neither hydrocarbons, nor hydrogen from hydrocarbon reforming (inevitably with CO) can be used as fuels for the PEMFCs. A further development thereof is polymer membranes, which can resist higher temperatures, such as 200° C.

MCFCs use molten alkali carbonates retained in a matrix as the electrolyte. Such a device requires an operation temperature of about 650° C. to maintain a molten state with sufficient ionic conductivity. Although some MCFCs have been on the market, there are still several technological issues critically hindering the commercialisation progress, mainly concerning serious material corrosion problems.

SOFCs usually use ceramic membranes (YSZ). Limited by its ionic conductivity, the YSZs require an operational temperature of about 1000° C., thereby resulting in considerable constrains on the materials used for interconnection, sealing and construction. However, as the electrolyte is solid—a mixture of yttria ($Y_2O_3$) and zirconia ($ZrO_2$)—problems with liquid handling and corrosion are avoided. Charge transfer in the electrolyte is done by oxygen ions ($O^{2-}$). Anodes made of nickel/zirconium oxide cermet were shown to be suitable; cathodes of lanthanum manganate ($LaMnO_3$) have been used, but require still some additional research.

Electrode reactions are summarised for the proton conducting case as follows:

Anode reaction: $H_2 (g) \rightarrow 2H^+ + 2e^-$ 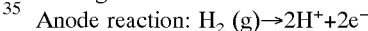

Cathode reaction: $2H^+ + 2e^- + \frac{1}{2} O_2 (g) \rightarrow H_2O (g/l)$ 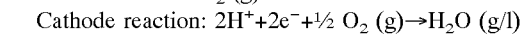

Overall reaction: $H_2 (g) + O_2 (g) \rightarrow H_2O (g)$ 

As the cathodic reaction uses oxygen only (or air) as oxidant, recirculation of carbon dioxide from the anode exhaust is not necessary, and thereby simplifies the system considerably. Carbon monoxide does not poison the electrodes and can also be used as a fuel. Difficulties in the development of SOFCs arise from the instability of the intercell connections, i. e. the contact areas between the cells, and the sealing due to a high temperature (1000° C.). Also thermal cycling is a problem. This limits the application of these systems. Research on medium-temperature solid oxide fuel cells has been performed, in which the cells are hydrogen-oxygen cells, the solid material is hydrogen-exchanged β-alumina. The operating temperature for this type of solid proton conductor is 150–200° C.

Internal fuel reforming is also possible. Sulphur is a big problem for all current fuel cell technologies, demanding an expensive gas treatment system, and also significantly decreasing the fuel cell system efficiency. Sulphate based electrolytes are chemically resistant to $H_2S$ and any sulphur containing gases, such as natural gas. The use of $Li_2SO_4$ as an electrolyte has been tested. This is described in D. Peterson and J. Winnick, J. Electrochem. Soc., 143 (1996) L55.

Catalysts have also been used to increase the output current of conventional fuel cells, which are batteries using galvanic cells powered by hydrogen and oxygen. Generally, such cells are fuelled by hydrogen gas derived from natural gas. There are also other techniques based on methanol, but they have not been successful.

Yet a new type of fuel cell was discovered in 1991, using a catalyst which gave a complete combustion of sugar, thereby forming carbon dioxide and water at a low temperature of just under 100° C. (Larsson Ragnar and Folkesson Börje, Lund University, Sweden.), the so-called "SuFuCell". This cell uses a bio fuel and saves global reserves of petroleum and natural gas. The carbon dioxide produced formed in the cell is re-utilised in the photosynthesis to produce new sugar or starch. All kinds of carbon hydrates, such as starch, cellulose etc can be employed.

Although the prior art fuel cells using sugar offer many of above possibilities there is still a demand for a cell with better performance, which is also less expensive.

SUMMARY OF THE DISCLOSURE

An object of the present invention, so called intermediate temperature ceramic fuel cells (ITCFCs), is to provide a fuel cell comprising a ceramic composite electrolyte, which fuel cell does not suffer from the drawbacks described above.

This is embodied in a ceramic membrane (CM) (electrolyte) and a ITCFC provided with such a membrane, according to the invention, which membrane (electrolyte) is based on salt-oxide ceramic composites.

According to a preferred embodiment of the invention, the ceramic membrane (electrolyte) is dense and gas tight.

According to another preferred embodiment of the invention the membrane (electrolyte) is oxygen ion conducting, for instance based on ceria based oxide composites, such as gadolinium doped ceria (CGO) and salt and possibly other inorganic compounds, to operate in ITSOFCs (300 to 800° C.) (Intermediate Temperature SOFCs).

According to another preferred embodiment of the invention, the membrane (electrolyte) is proton conducting ceramic composites based on halide- and hydrohalide-based ceramics, to operate in ITCFCs (Intermediate Temperature CFCs). Composite is referred to as a mixture with at least two different separated phases.

According to another preferred embodiment of the invention, there is provided a fuel cell, comprising
  a fuel chamber
  an anode,
  a cathode,
  an electrolyte disposed between the anode and cathode,
  an oxidant chamber, wherein said chambers and enclose said anode, cathode and electrolyte,
  wherein a fuel flowing from the fuel chamber, such as hydrogen is oxidised at the anode, thereby producing electrical energy, wherein said electrolyte is a ceramic composite electrolyte comprises at least one salt and at least one oxide.

In some extreme cases, the electrolyte can also have no oxide phase, being a two phase salt/inorganic compound, comprising at least one solid state phase, such as two fluoride phases, or one fluoride with one molten phase, MOH (M=Li, Na, K) etc.

Preferably, the electrodes, i. e. the anode and cathode, are porous.

The electrolyte can comprise up to 99% salt and the salt can be in solid or molten state. Also in some cases, 100% salts with two phases, e.g., two fluorides (chlorides) or fluorides mixed with other pure salts, e.g., $MH_x$, (M=Li, Na, Ca etc., x=1, 2) or MClx (M=Li, Na, Ba, Sr etc., x=1, 2) are possible.

The salt (molten or solid state)-oxide composites (SOC) can be selected from all salts and oxides that can make the SOC material function as a specific conductor for particular ions such as $H^+$, $O^{2-}$, or of other ionic charge, e.g., cationic $Li^+$, $Na^+$, $K^+$, or anionic, $CO_3^{2-}$, $Cl^-$ and $F^-$ etc.), or a mixture thereof. Specific suitable salts and oxides can be such as various natural salts, NaCl etc., and oxides such as $Al_2O_3$ etc., and synthesised compounds having similar properties.

Specific examples of SOCs comprise for instance: i) chlorite salts and composites which can have good $Cl^-$ conduction. Therefore, the fuel cell according to the invention can also be used for treating industrial waste chlorine gas. ii) fluoride/hydrofluoride-based alumina composites can have excellent proton conduction. iii) Also in some cases, pure salt systems, e.g., two fluorides (chlorides) or fluorides mixed with other pure salts, e.g., $MH_x$, (M=Li, Na, Ca etc., x=1, 2) or MClx (M=Li, Na, Ba, Sr etc., x=1, 2) for proton conduction.

In some extreme cases, the electrolyte can comprise salt, say, two fluoride phases to 100%.

The oxide can be almost any suitable oxide, such as alumina, causing significant electronic and ion conduction. It is important that the material in the electrolyte is highly ion conducting.

The fuel employed can for instance be $H_2$ or twon gas.

The intermediate temperature (300–800° C.) allows use of cheap metals as electrode and interconnecting materials, which avoids high temperature (1000° C.) material and technical problems and also reduces the cost.

Furthermore, the fuel cell according to the invention can operate as a ceramic membrane electrochemical reactor. Fabrication techniques developed for inorganic membranes such as extrusion, tape casting and doctor-blade for porous ceramic support, tape casting, sol-gel/suspension, CVD techniques for both porous electrodes and dense electrolyte membranes, can also be readily employed in the fabrication.

For constructing high voltage devices, all current high performance oxide electrodes such as various binary oxides, AxByOz (A, B=Li, Mg, Ca, Sr, Cr, Fe, Co, Ni, Cu, Y, La, Ce, Zr, Ti, etc.), e.g., Ce1-xBxO2-y, $MNO_2$ and La1-xSrxMnO3, and salt-oxide ceramic composite electrodes can be employed.

Since the device, in some cases, has the character of a combination of different galvanic cells, e.g., fuel cells and battery, a higher voltage than that of fuel cells can be achieved.

The device according to the present invention is as an ideal source for high power generation. One reason is because the materials comprised in the device are available in large amounts and highly cost effective. In addition, there is no need for expensive catalysts as in conventional low temperature fuel cells, i. e., operating below 200° C. The device according to the invention can function at intermediate temperatures, say, 300 to 800° C.

The results obtained from the fluoride-based ceramic composite electrolyte fuel cells show a short circuit current density close to 1000 mA/cm² and peak power of 180 mW/cm², which is below 300 mA/cm² (0.6 V), at 750° C., see FIG. 1. However, there is a large potential for further development, since the results are obtained for bulk and raw disk-type electrolytes only. It can be expected that performance will be significantly improved by a person skilled in the art, by using this technology. The key issue is to optimise electrolyte by employing ceramic membrane technologies, and develop more efficient and compatible electrodes for the new CFCs, which are also claimed.

BRIEF DESCRIPTION OF THE DRAWINGS

The present invention will now be described in more detail with reference to preferred embodiments of the invention, given only by way of example, and illustrated in the accompanying drawings, in which.

DETAILED DESCRIPTION OF THE PREFERRED EMBODIMENTS

Figure 1:
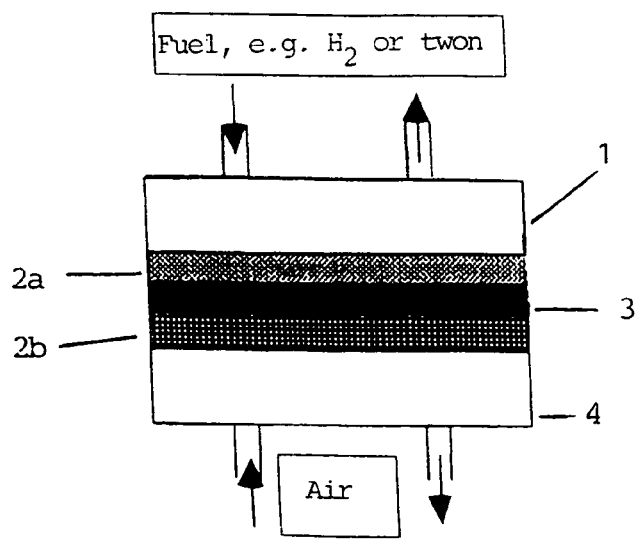
FIG. 1 illustrates a fuel cell according to the invention.

Referring to FIG. 1, the fuel cell 1 according to invention essentially consists of two porous electrodes 2 separated by a dense, proton (or oxygen) conducting salt-oxide (or composite) electrolyte 3, where anode 2a and cathode electrodes 2b can be made of e.g., spinel or peroveskite oxides, and the fuel and oxidant chambers 4 surrounding said electrodes 2 can be made of a metal, such as stainless steel.

The fuel circulates in the fuel chamber and part of the fuel is oxidised at the anode. At the same time air is oxidised at the cathode.

Because of the electrochemical cell reaction: $H_2 + \frac{1}{2}O_2 = H_2O$ at the cathode side, the formation of the cell reaction product, $H_2O$ can be exhausted together with the air (oxygen), so that the fuel can be re-cycled without requiring water elimination. Thus, it is easy to simplify the device, reduce the fuel cost and also increase the efficiency of the fuel-energy conversion.

The free energy change of the combustion of the device in FIG. 1 corresponds to an open cell voltage (OCV) of 1.23 V at ambient temperature (25° C.). For high temperatures, this OCV value follows a linear decreasing curve, between 1.0 to 1.2 V. The device can reach a voltage of up to 1.8 V, which is only achieved for limited electrode pair materials. Such a high cell voltage is assumed to be caused by a combination of battery and fuel cell effects.

Current Output and Operating Efficiency

Figure 5:
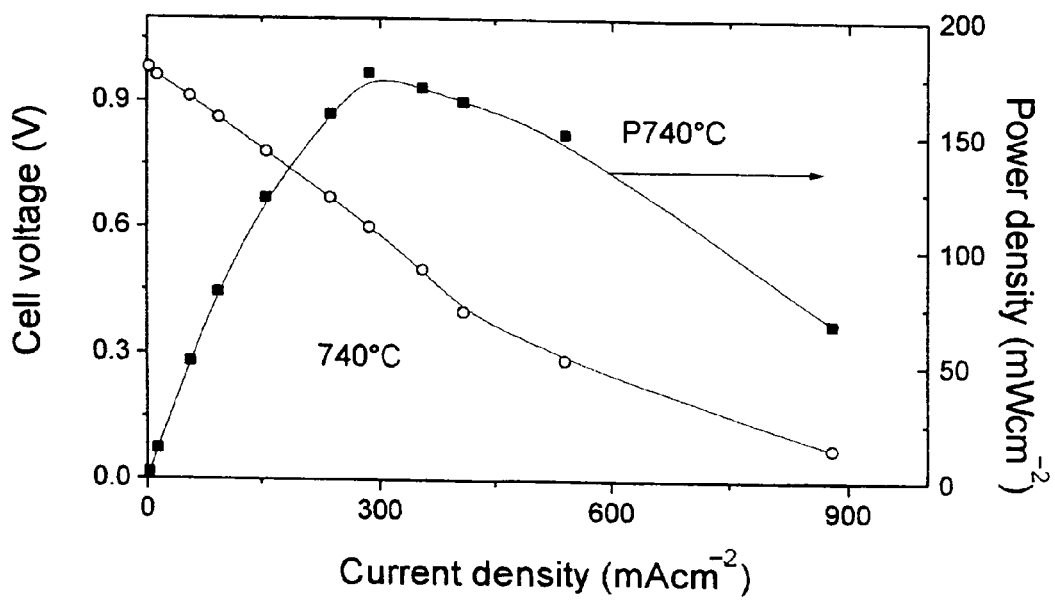
FIG. 5 illustrates a typical I-V characteristic of a fuel cell device using the hydrofluoride-based composite electrolyte.
Figure 6:
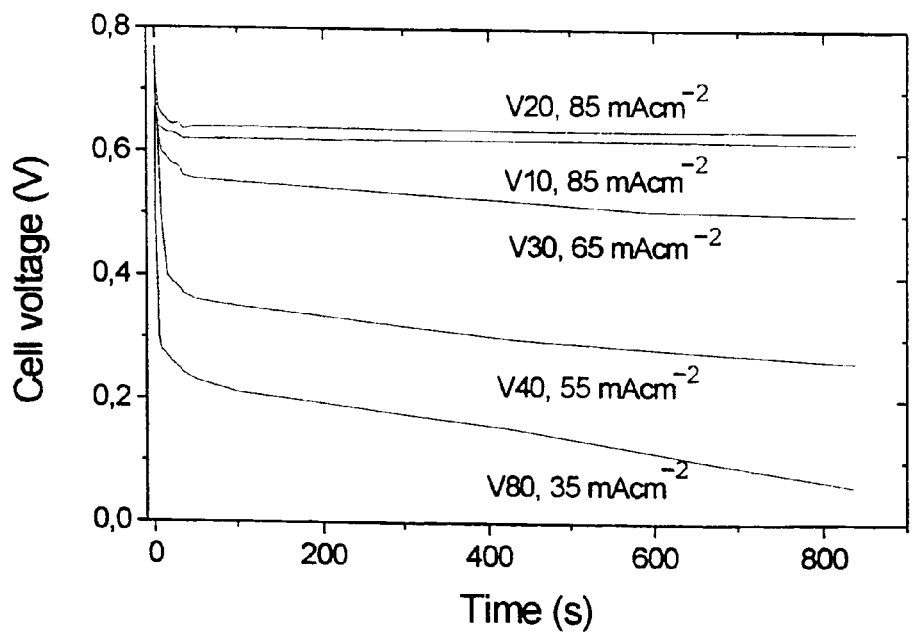
FIG. 6 illustrates discharge curves for the fuel cell illustrated in FIG. 5 during operation with various current outputs.

In FIG. 5. A current output of 300 mA/cm$^2$ at a cell voltage 0.6 V at 740° C., corresponded to a power of 180 mW/cm$^2$. The cell voltage operating electricity efficiency is 0.6/1.2=50%. This efficiency can be further increased by the electrolyte conductivity and compatible electrode materials. Most power loss during operation is recognised due to the interfacial loss, since the oxide electrodes are not excellently compatible with the salt electrolytes.

Voltage

Voltages depended on both electrolytes and electrodes. An example of the unusual high voltage device is constructed as:

Doped NiOx/salt-oxide ceramic composites/LaSrCoFeO.

Materials

Composites of salts, specially, chlorides, fluorides and hydro-type-halides containing $MH_x$ etc., and oxides have been successfully synthesised for electrolyte materials, and some of them used also as electrode materials, for intermediate temperature, say 300 to 800° C., fuel cell (ITFC) devices. The materials can use natural resources and syn- thesising technique has a great flexibility in selection of materials, and advantages of easy preparation, large scale products available and high cost effective.

It is possible to use synthesised salt-alumina composite containing min. 99.9% salt, e.g., NaCl as main components to prepare proton conducting salt-oxide composite ceramics. A fuel cell device using $MCl_x$-based composite electrolyte has achieved 1.0 to 1.4 V cell voltage between 350 to 700° C., and several hundreds of mA/cm$^2$ can be drawn from this fuel cell.

Due to an excellent chemical stability of sulphate-based electrolytes with $H_2S$, the fuel cell can use $H_2S$ as fuel, which may work as a desulphonication device for sulphur recovery and treatment of hazardous gases. The device can be continuously operated with stable current output. During the operation, sulphur and water were collected from the anode and cathode, respectively, indicating success in $H_2S$ removal and electricity generation. Thus, it is possible to use natural gas, coal and other sulphur containing gas as fuels without a high extra cost compared to a traditional clean-up station, due to the extra electricity production.

CFCs using the fluoride based electrolytes have may use various liquid fuels for operation. The direct use of logistic fuels such as ethanol or kerosene will simplify the introduction of the fuel cell technology into the commercial market. It is possible to use ethanol or even gasoline as fuel.

The ITCFCs show unique advantages for operating liquid fuels due to high proton conduction and fast electrode kinetics in the intermediate temperature region, without use of a noble catalysts. A direct ethanol CFC device has been operated up to 200 mAcm$^{-2}$ at 700° C.

Some more examples are merely intended to illustrate the invention, and are not limiting.

EXAMPLES

Unusual Examples

Example 1

Figure 2:
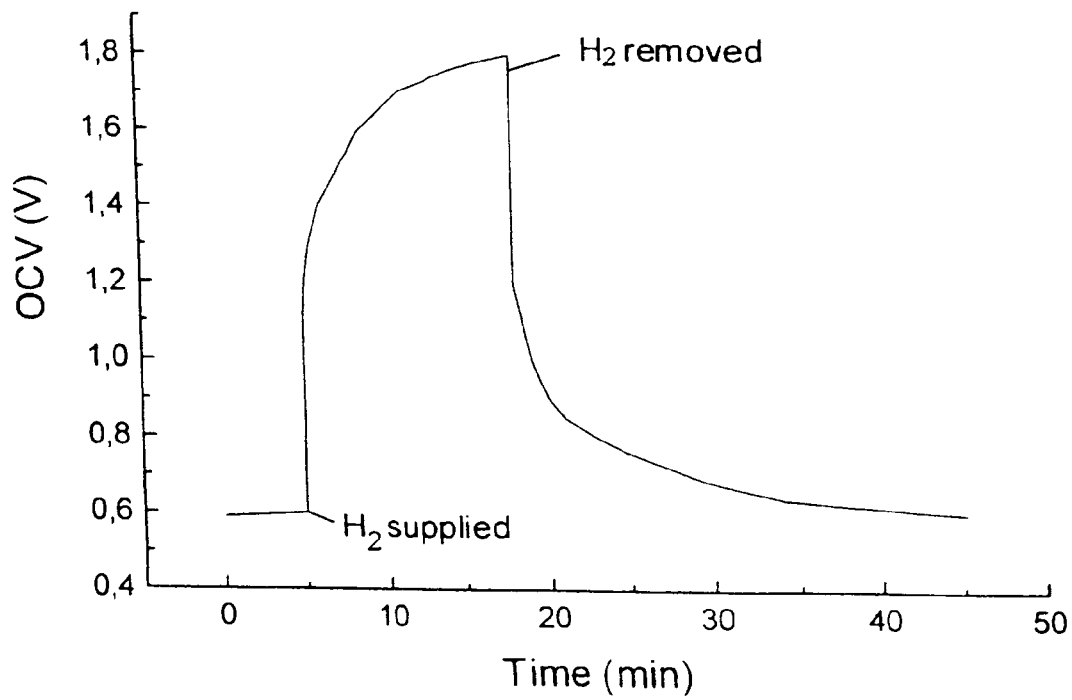
FIG. 2 illustrates time dependence of an open circuit voltage (OCV) at 450° C. according to one embodiment of the invention.

In ambient atmosphere, the device according to the invention, illustrated in FIG. 1 showed an OCV between 0.4 to 0.6 V, for both electrodes, whereby the current that could be drawn out rapidly decreased. As long as hydrogen was supplied to the anode of doped NiOx, and air to the cathode of LaSrCoFeO, the OCV suddenly jumped to about 1.0 V, and increased with time gradually to about 1.5 to 1.8 V. When the hydrogen supply was removed, the OCV first dropped steeply then decreased gradually with time. These observations are schematically shown in FIG. 2. Further tests were done by exchanging the electrode sides, i.e., the hydrogen was supplied to the LaSrCoFeO electrode, and air to the doped NiOx electrode, whereby the device showed an OCV close to the former OCV value but with negative sign.

Figure 3:
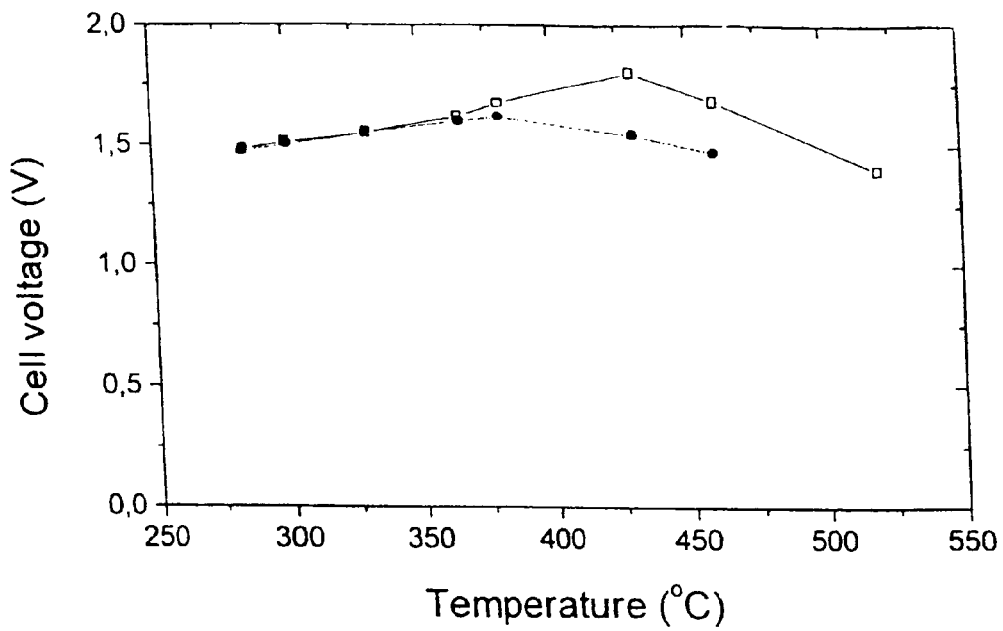
FIG. 3 illustrates temperature dependence of the OCV according to one embodiment of the invention.
Figure 4:
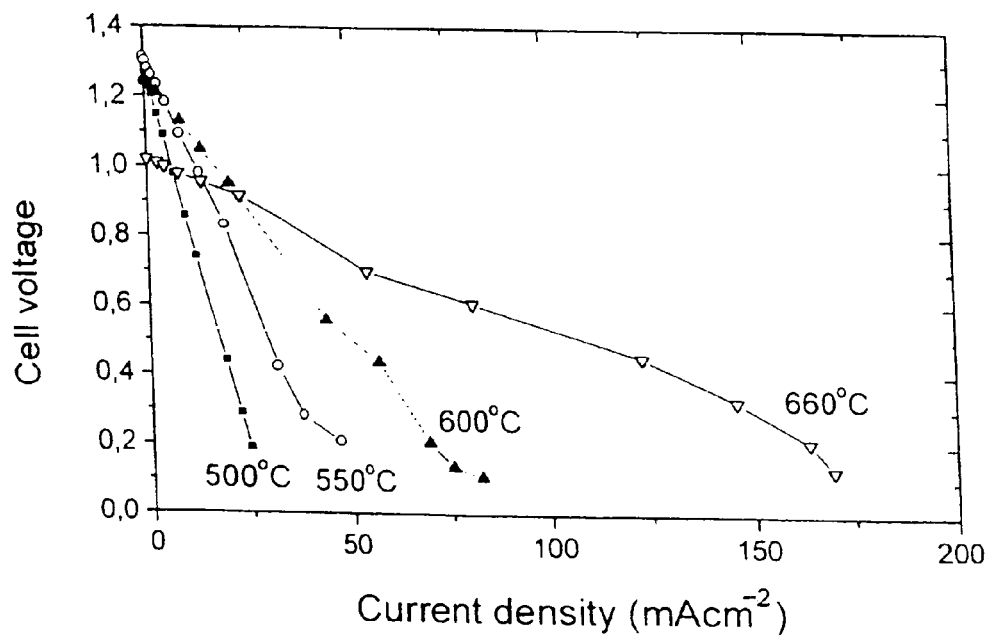
FIG. 4 illustrates a typical current-voltage (I-V) characteristic of a fuel cell device using commercial NaCl salt as one of the main components of the electrolyte.

FIG. 3 shows two curves for devices according to the invention using different salt electrolytes. Several tens to hundred of mA/cm$^2$ can be taken out from the devices. A typical current density-voltage curve (I-V curve) is shown in FIG. 4.

Example 2 (Non Electrode Construction)

When using only electrolyte GdxCe1-x pellet to achieve fuel cell devices without electrodes, an OCV of such a "non-electrode construction" fuel cell device is 0.96 V, i. e., about 0.2 V higher than conventional constructions with electrode using the same electrolyte. Only about 2 mA/cm$^2$ can be taken out from this device. The function is based on the fact of the ionic conducting bulk material, GdxCe1-x as the electrolyte, on each of its surface, whereby the significant electronic and ionic conduction can be caused when reacting with the gas and function as anode and cathode, respectively. It is discovered that the performance of this device was recognised to be limited by the air surface, because in the air (or oxygen) the GdxCe1-x dose not create enough electronic conduction, resulting in that an improved construction was made using only one electrode, of e.g., Pt or Ag (paste) for the cathode, i.e., ($H_2$)GdxCe1-x/Pt or Ag (air)

In this device, the current can be increased by almost one order of magnitude. The further improvement can be done regarding the ion-doping technique to prepare sufficient electronic conducting ceria-based materials. It can be seen clearly from this fuel cell device without using electrode materials, that the SOFC technology will be greatly simplified and more cost effective. Using doped $Bi_2O_3$-based oxides instead of doped ceria-based oxide electrolytes will improve cell performance to a large extent.

Example 3 (Practical Devices)

Fuel cells using the fluoride and hydrofluoride-based composite electrolytes (proton conducting type) and ceria-salt (halides) composite electrolytes are typical examples for practical ITCFC devices, one example is shown in FIG. 5. All these new type ITCFCs have demonstrated a performance well reach the present commercialising standards. In addition, ITCFCs using the sulphate-based electrolytes as the high sulphur tolerant device can treat high sulphur containing fuels, e.g., natural gas or by-products from the refining petroleum process, and at the same time to produce the electricity. This sulphur tolerant CFC device can be expected as the gas-pretreatment station combined with MCFC power plant to invent a new power generation technology.

It will be appreciated by those skilled in the art that the examples mentioned above are primarily for the purpose of illustration and are not meant to imply any limitation of the present invention.

What is claimed is:

1. A fuel cell for production of electrical energy, comprising
   a fuel chamber (1)
   an anode (2*a*),
   a cathode (2*b*),
   an electrolyte (3) disposed between said anode and said cathode,
   an oxidant chamber (4), wherein said chambers (1) and (4) enclose said anode, cathode and electrolyte,
   wherein said electrolyte (3) is a ceramic CSC (ceria salt composite) electrolyte with an operating temperature range of 300°–800° C. and comprising at least one salt and at least one ceria phase, and
   wherein the electrolyte is sulphate-based CSC for sulphur containing fuels, intended to operate as a high sulphur tolerant CFC device, acting as a pre-gas treatment station and intended to be combined with MCFC power plants.

2. A fuel cell according to claim 1, wherein the electrolyte comprises salts selected from salts that makes the CSC material function as a specific conductor for particular ions.

3. A fuel cell according to claim 1, wherein the electrodes comprise binary oxides selected from the group of binary oxides consisting of: $A_xB_yO_z$ (A, B=Li, Mg, Ca, Sr, Cr, Fe, Co, Ni, Mn, Cu, Y, La, Ce, Zr, or Ti).

4. A fuel cell according to claim 2, wherein the electrodes comprise binary oxides selected from the group of binary oxides consisting of: $A_xB_yO_z$ (A, B=Li, Mg, Ca, Sr, Cr, Fe, Co, Ni, Mn, Cu, Y, La, Ce, Zr, or Ti).

* * * * *